United States Patent [19]

Fresenius

[11] Patent Number: 5,194,148
[45] Date of Patent: Mar. 16, 1993

[54] HYDRAULIC CYLINDER EXTENSION DEVICE FOR A FILTER PRESS

[75] Inventor: Jurgen Fresenius, Bad Schwalbach, Fed. Rep. of Germany

[73] Assignee: Passavant-Werke AG, Fed. Rep. of Germany

[21] Appl. No.: 691,800

[22] Filed: Apr. 26, 1991

[30] Foreign Application Priority Data

Apr. 27, 1990 [DE] Fed. Rep. of Germany ....... 9004766

[51] Int. Cl.[5] ............................................. B01D 25/19
[52] U.S. Cl. .................................... 210/230; 100/197; 100/199
[58] Field of Search ................. 210/224, 230; 100/113, 100/194, 199, 197

[56] References Cited

U.S. PATENT DOCUMENTS

| | | | |
|---|---|---|---|
| 962,346 | 6/1910 | Heller | 210/230 |
| 1,331,350 | 2/1920 | Miller | 210/230 |
| 2,192,868 | 3/1940 | Malkin | 210/230 |

OTHER PUBLICATIONS

Passavant Prospectus 4-7312, Oct., 1972.
Von Roll Brochure, Feb., 1986.

Primary Examiner—Matthew O. Savage
Attorney, Agent, or Firm—Larson and Taylor

[57] ABSTRACT

A device for extending the operable range of a hydraulic cylinder in a filter press is disclosed herein. The filter press includes an overhead beam, first and second end stands connected to respective ends of said beam, a plurality of filter plates movably suspended from said overhead beam between the end stands, and a follower movably mounted and suspended from said overhead beam. The second end stand includes a guide bush and a flange for removably attaching a hydraulic cylinder therein. The device for extending the range of the hydraulic cylinder includes a tube dimensioned to receive the hydraulic cylinder therein, the tube including a shaft at one end thereof receivable in the guide bush, the shaft including a flange extending thereabout to bear against the flange of the guide bush, and a flange extending about the other end of the tube to bear against the flange of the hydraulic cylinder.

3 Claims, 1 Drawing Sheet

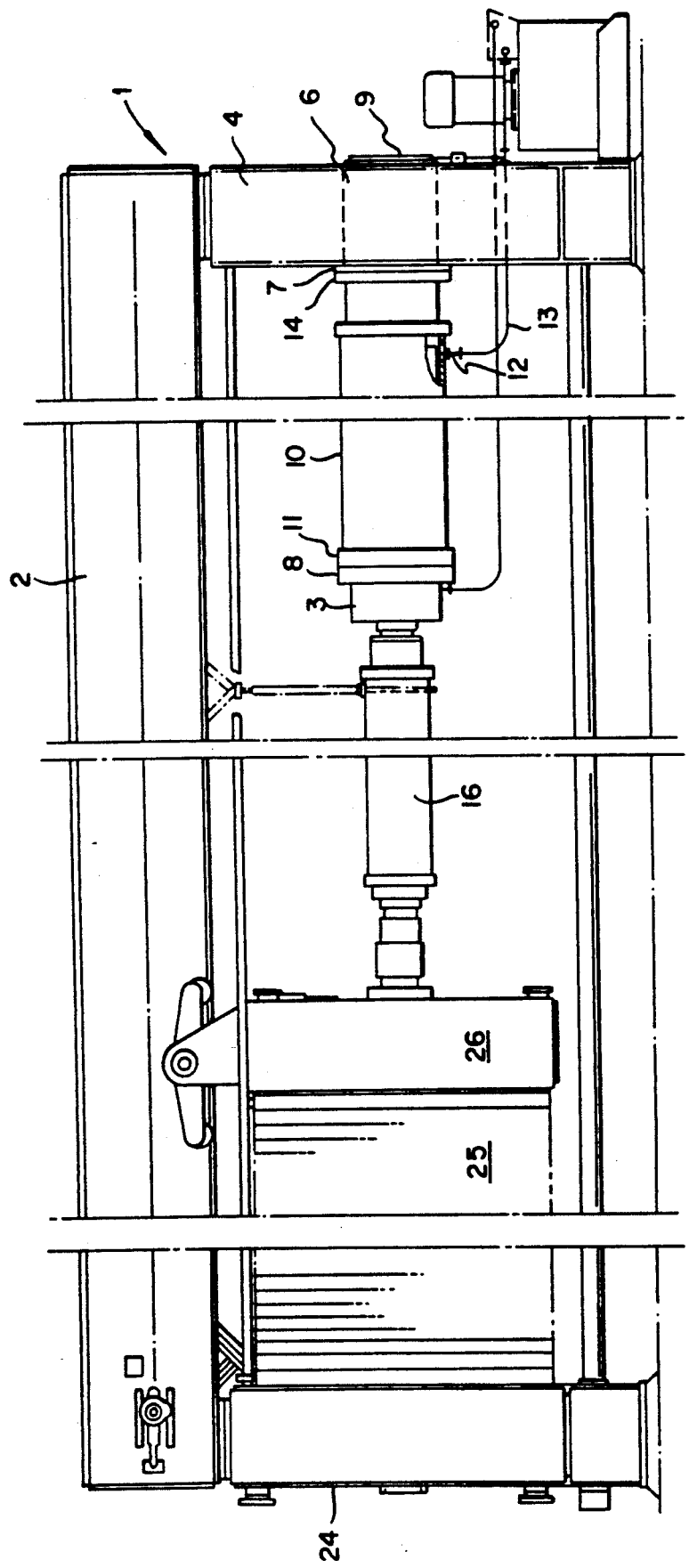

5,194,148

HYDRAULIC CYLINDER EXTENSION DEVICE FOR A FILTER PRESS

FIELD OF THE INVENTION

The invention relates to a chamber filter press for dewatering of sludge from waste water treatment plants or from industrial processes.

BACKGROUND OF THE INVENTION

Such chamber filter presses consist of a press frame with two stands and an overhead beam as well as of a multitude of filter plates which are movably suspended within the frame. A hydraulically activated follower closes the filter plate pack during operation.

There are cases where the chamber filter press is operated first with a smaller number of filter plates and re-equipped with more filter plates later. It would be possible, however, to purchase also the filter plates which at first are not required and to remove them before the start of operation. There is no sense in constructing a hydraulic cylinder which is so long as to be able to close any number of filter plates during operation. Clearly, the buckling strength of such a piston rod would not be sufficient.

The task here is to offer here a useful solution according to the invention by providing an extended reception device for the hydraulic cylinder which is attached removably to the stand and moves the hydraulic cylinder to the follower by the required extent. Then, in most cases an extension of the piston rod is no longer necessary or it can be essentially smaller, allowing for a sufficient buckling strength. Preferably the reception device is built as a tube which receives the cylinder almost completely. The tubular reception device is preferably equipped with identical flanges at both ends or with flanges matching the mounting flange of the hydraulic cylinder. By this means the hydraulic cylinder can be attached at the stand without needing additional fitting parts. To increase the resistance against tilting of the reception device, the tube can be extended so it reaches into the stand where a guide bush will be mounted.

BRIEF DESCRIPTION OF THE DRAWINGS

The single drawing illustrates a side view of one embodiment of the present invention.

DETAILED DESCRIPTION OF THE PREFERRED EMBODIMENT

Referring now to the drawing, the overhead beam (2) of the frame press (1) is shown with end stands (4) and (24), with the stand (4) receiving the hydraulic cylinder. Filter plates (25) are shown between end stand (24) and follower (26).

The stand (4) is provided with a guide bush (6) and a welded flange (7) which mates with the connecting flange (8) of the hydraulic cylinder (3). The extension (9) of the tubular reception device (10), which has a flange (11) at the head end which mates with the connection flange (8), fits into the guide bush (6) without much clearance. The tube of the reception device (10) has an opening in the vicinity of the hydraulic connection (12). Here the hydraulic line (13) is connected. At the broken section it can be seen that the hydraulic cylinder ends there. The external diameter of the tubular reception device becomes smaller at that point so that the flange (14) can be screwed to the stand the flange 7 of the stand the same way as flange 8 of the hydraulic cylinder can be screwed to flange 7 in the absence of reception device 10.

If the number of filter plates in use is reduced further, an extension (16) which now can be very short, will be attached to the head of the piston rod. In order to prevent radial charges to the piston guide rings and sealing elements, the extension (16) is suspended from a carriage (17) which is guided movably on the overhead beam (2).

I claim:

1. A chamber filter press for dewatering of sludge, said filter press comprising:

an overhead beam, first and second end stands connected to respective ends of said beam, a plurality of filter plates movably suspended from said overhead beam between said end stands, and a follower movably mounted and suspended from said overhead beam, said follower being provided to press said plurality of filter plates between said follower and said first end stand, said second end stand including guide bush means for removably attaching a hydraulic cylinder thereto;

a hydraulic cylinder located between said second end stand and said follower, said hydraulic cylinder being receivable within said guide bush means and including a flange extending thereabout to bear against a flange attached about said guide bush to axially fix said hydraulic cylinder with respect to said second end stand, said hydraulic cylinder including piston means extending from one end thereof, said piston means being arranged to contact said follower for moving said follower to close said filter plates between said follower and said first end stand and to exert a closing force on said filter plates; and means for extending the range of the hydraulic cylinder with respect to the second end stand, said means for extending including a tube dimensioned to receive said hydraulic cylinder therein, said tube including shaft means at one end thereof receivable in said guide bush means for removably attaching said tube to said second end stand, said shaft means including flange means extending thereabout to bear against the flange of said guide bush for axially fixing said tube with respect to said second end stand, and flange means extending about the other end of said tube to bear against the flange of said hydraulic cylinder to axially fix the hydraulic cylinder with respect to said tube;

whereby when said means for extending is included, it extends an operable distance of said hydraulic cylinder between said follower and said second end stand, and when said means for extending is removed, said operable distance of said hydraulic cylinder between said follower and said second end stand is reduced.

2. A chamber filter press according to claim 1 wherein said tube has an opening at said other end near said second end stand for connection to a hydraulic line to an interior of said cylinder.

3. A chamber filter press according to claim 1, including an elongate extension member removably attached to said piston means and arranged to contact said follower to further extend the operable distance of said hydraulic cylinder between said follower and said second end stand.

* * * * *